(12) United States Patent
Nishio et al.

(10) Patent No.: US 7,242,853 B2
(45) Date of Patent: Jul. 10, 2007

(54) RECORDING/REPRODUCING SYSTEM

(75) Inventors: Toshiro Nishio, Hirakata (JP); Shoichi Goto, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 940 days.

(21) Appl. No.: 10/380,853

(22) PCT Filed: Sep. 14, 2001

(86) PCT No.: PCT/JP01/07976

§ 371 (c)(1),
(2), (4) Date: Apr. 17, 2003

(87) PCT Pub. No.: WO02/23897

PCT Pub. Date: Mar. 21, 2002

(65) Prior Publication Data

US 2003/0182662 A1    Sep. 25, 2003

(30) Foreign Application Priority Data

Sep. 18, 2000 (JP) ............................. 2000-282481

(51) Int. Cl.
*H04N 7/26* (2006.01)
(52) U.S. Cl. ..................... 386/111; 386/124; 386/109; 386/33; 386/27; 386/91; 386/46; 386/112
(58) Field of Classification Search ........ 386/111–112, 386/46, 91, 109, 33, 27
See application file for complete search history.

(56) References Cited

U.S. PATENT DOCUMENTS 5,923,812 A * 7/1999 Sakazaki et al. ............. 386/68
5,991,503 A * 11/1999 Miyasaka et al. ............ 386/111
6,021,199 A *  2/2000 Ishibashi .................... 380/217
6,289,164 B1 * 9/2001 Hori et al. ................... 386/46

FOREIGN PATENT DOCUMENTS

| EP | 0 891 081 | 1/1999 |
|---|---|---|
| JP | 8-125966 | 5/1996 |
| JP | 8-140055 | 5/1996 |
| JP | 8-235832 | 9/1996 |
| JP | 8-340541 | 12/1996 |
| JP | 9-098382 | 4/1997 |
| JP | 10-042255 | 2/1998 |

\* cited by examiner

*Primary Examiner*—Thai Q. Tran
*Assistant Examiner*—Helen Shibru
(74) *Attorney, Agent, or Firm*—Wenderoth, Lind & Ponack, L.L.P.

(57) ABSTRACT

In a recording/reproducing system $RRS_1$, an I-picture detecting section 15 generates, from a transport stream DETS output from a descrambler 13, a control signal CS indicating a bit location of a TS packet including a part of an I picture for output. Based on the control signal CS, a TS header processing section 16 specifies a TS header added to a payload of an I picture from the transport stream TS, and changes a value of a reserved bit in the TS header from 0 to 1. In high-speed replay, a storage unit $SU_1$ refers to the reserved bit of the TS header to select only an I-picture transport packet required for high-speed replay, and composes a transport stream PRTS for transmission to a decode unit $DU_1$. Thus, high-speed replay can be easily achieved.

13 Claims, 9 Drawing Sheets

FIG. 2

| Syntax | No. of bits | Mnemoric |
|---|---|---|
| Transport_packet() { | | |
|   sync_byte | 8 | bslbf |
|   transport_error_indicator | 1 | bslbf |
|   payload_unit_start_indicator | 1 | bslbf |
|   transport_priority | 1 | bslbf |
|   PID | 13 | bslbf |
|   transport_scrambling_control | 2 | bslbf |
|   adaptation_field_control | 2 | bslbf |
|   continuity_counter | 4 | uimsbf |
|   if(adaptation_field_control=='10' \|\| adaptation_field_control=='11') { | | |
|     adaptation_field() | | |
|   } | | |
|   if(adaptation_field_control=='01' \|\| adaptation_field_control=='11') { | | |
|     for(i=0;i<N;i++) { | | |
|       data_byte | 8 | bslbf |
|     } | | |
|   } | | |
| } | | |

F I G. 4

| Syntax | No. of bits | Mnemoric |
|---|---|---|
| PES_packet() { | | |
|   packet_start_code_prefix | 24 | bslbf |
|   stream_id | 8 | uimsbf |
|   if(stream_id!=program_stream_map | 16 | uimsbf |
|   && stream_id!=transport_priority | | |
|   && stream_id!=private_stream_2 | | |
|   && stream_id!=ECM | | |
|   && stream_id!=EMM | | |
|   && stream_id!=program_stream_directory | | |
|   && stream_id!=DSMCC_stream | | |
|   && stream_id!=ITU_TRec.H222.1typeE_stream) { | | |
|     '10' | 2 | bslbf |
|     PES_scrambling_control | 2 | bslbf |
|     PES_priority | 1 | bslbf |
|     data_alignment_indicator | 1 | bslbf |
|     copyright | 1 | bslbf |
|     original_or_copy | 1 | bslbf |
|     PTS_DTS_flags | 2 | bslbf |
|     ESCR_flag | 1 | bslbf |
|     ES_rate_flag | 1 | bslbf |
|   ···OMITTED··· | | |
| } | | |

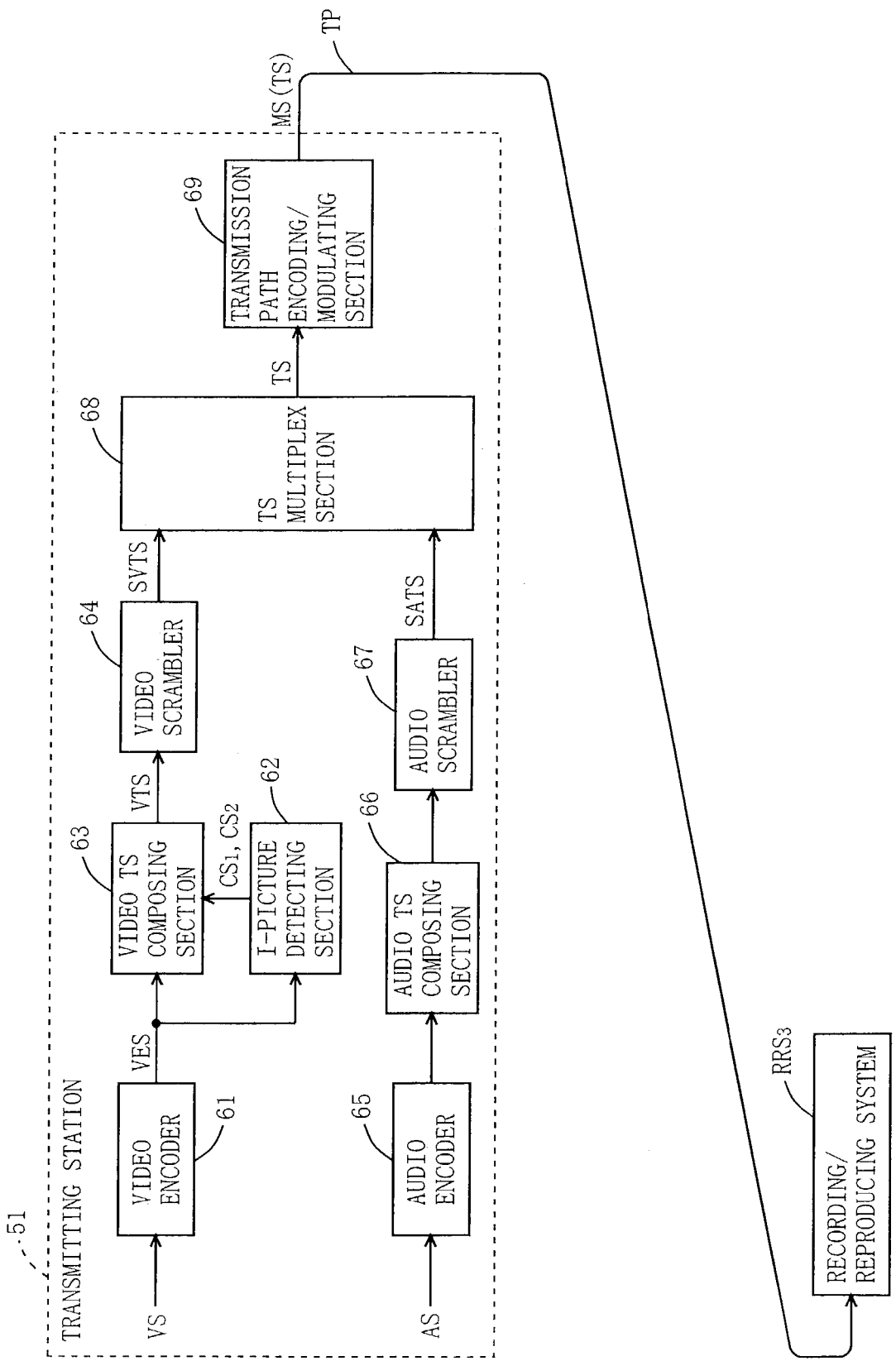

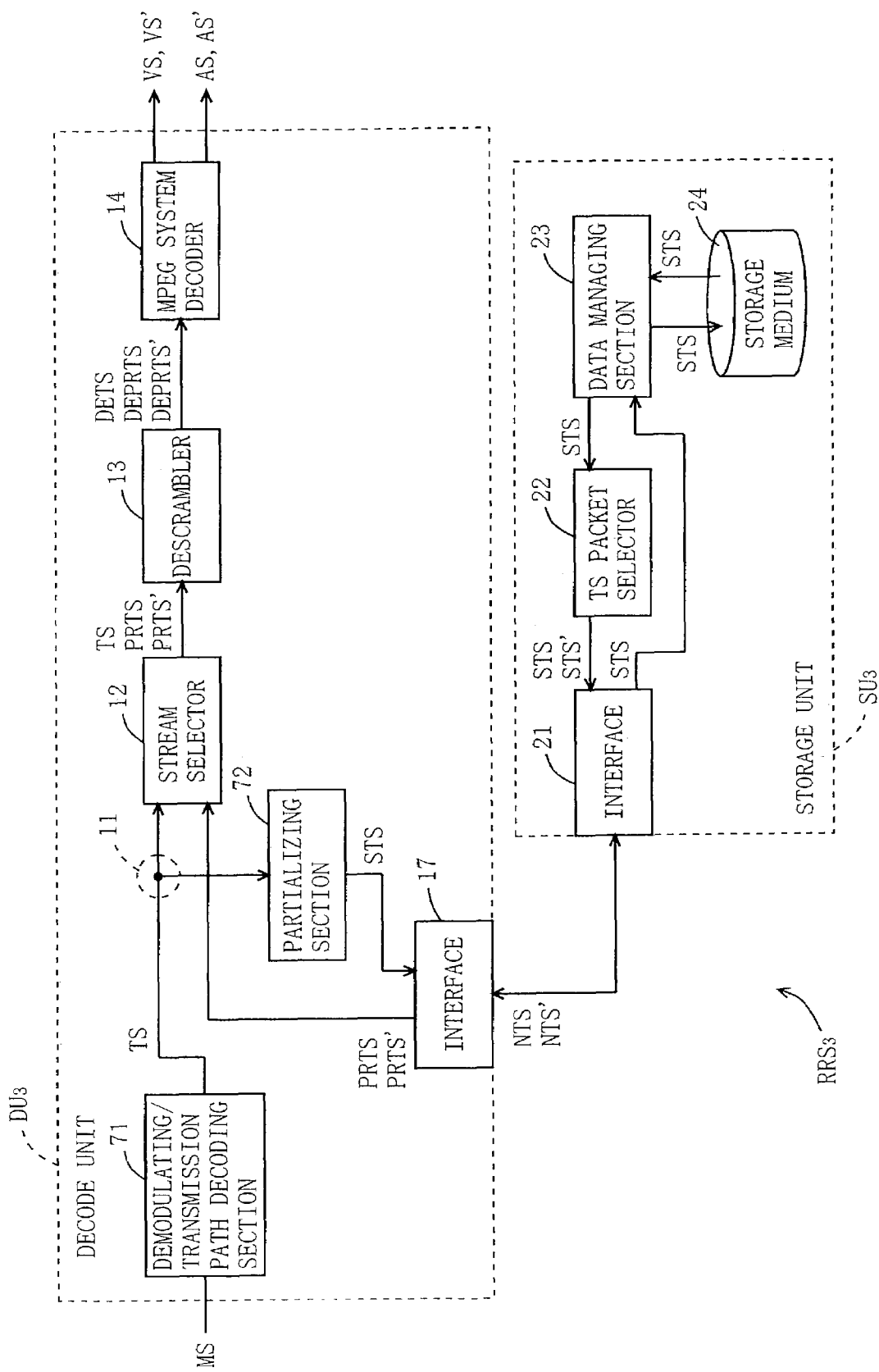

RECORDING/REPRODUCING SYSTEM

TECHNICAL FIELD

The present invention relates to recording/reproducing systems and, more specifically, to a system in which a scrambled transport stream is recorded on a storage medium, and a digital signal is reproduced from the recorded transport stream.

BACKGROUND ART

The above-mentioned recording/reproducing system employs a digital highly-efficient encoding technology typified by MPEG2 (Moving Picture Experts Group Phase 2). With the digital highly-efficient encoding technology, the conventional recording/reproducing system has been capable of recording received transport streams for a long period of time without degradation in image quality. In most cases, however, each payload in a transport stream has been scrambled in view of video copyright protection.

Also, of the respective pictures encoded in accordance with MPEG2, the recording/reproducing system may perform a process of selectively reproducing pictures coded with an intra-frame coding scheme (such pictures are hereinafter referred to as I pictures, and such a process is hereinafter referred to as high-speed replay).

With reference to FIG. 9, a recording/reproducing system for performing high-speed replay is described below. In FIG. 9, the recording/reproducing system includes a data managing section 1001, a recording medium 1002, a selector 1003, a descrambler 1004, an MPEG system decoder 1005, and a position information generating section 1006.

The above-structured recording/reproducing system has three basic operation modes described below.

First, in a first operation mode, an externally-supplied transport stream TS that has arrived at the recording/reproducing system is branched into two. One transport stream TS is output to the data managing section 1001, while the other is output to the selector 1003.

The data managing section 1001 temporarily stores the input transport stream TS in an internal buffer, and then waits for position information PI to come from the position information generating section 1006.

In the first operation mode, the selector 1003 selects an input system of the externally-supplied transport stream TS, and then outputs the input transport stream TS as it is to the descrambler 1004.

The descrambler 1004 uses a descramble key to descramble the scrambled input transport stream TS. Thus, a transport stream DETS is reconstructed, which has now become a data string that can be parsed. The transport stream DETS is output to the MPEG system decoder 1005 and the position information generating section 1006.

The MPEG system decoder 1005 performs a decoding process on the input transport stream DETS to reproduce a video signal VS and an audio signal AS. Both the video signal VS and the audio signal AS are baseband digital signals. The video signal VS represents video for a program or the like, while the audio signal AS represents audio for a program or the like. The video signal VS is output to a display device (not shown), while the audio signal AS is output to an audio output device (not shown).

The position information generating section 1006 searches the transport stream DETS output from the descrambler 1004 for a transport packet whose payload includes a part of I pictures (hereinafter referred to as I-picture transport packet). When such an I-picture transport packet is found, the position information generating section 1006 specifies a bit location in the transport stream DETS of the relevant packet. Each bit location is output as position information PI to the data managing section 1001.

The data managing section 1001 responds to the input of the position information PI to start a process of generating an address table AT. As described above, the data managing section 1001 holds the transport stream TS in its internal buffer. However, the transport stream TS in the buffer has been scrambled. Therefore, the data managing section 1001 cannot directly find an I-picture transport packet from the transport stream TS. For this reason, the data managing section 1001 refers to the input position information PI to specify the bit location of the I-picture transport packet on the transport stream held in the buffer.

Furthermore, the data managing section 1001 determines which address area of a first storage area 10021 of the storage medium 1002 is used to record each transport packet of the transport stream TS held in the buffer, that is, assigns each transport packet an address area. Then, the data managing section 1001 collects only the address areas assigned to the I-picture transport packets to generate an address table AT.

Then, the data managing section 1001 writes each transport packet held in the buffer in the first storage area 10021. Also, the data managing section 1001 writes the generated address table AT in a second storage area 10022 of the storage medium 1002.

Next, a second operation mode, that is, normal replay, is described. In the second operation mode, the data managing section 1001 reads the transport stream TS sequentially from its head from the first storage area 10021, without consideration of the address table AT in the second storage area 10022, for output to the selector 1003.

The selector 1003 selects an input system on the data managing section 1001 side in the second operation mode, and then outputs the input transport stream TS as it is to the descrambler 1004.

The descrambler 1004 and the MPEG system decoder 1005 perform processing similar to that in the first mode to reproduce the video signal VS and the audio signal AS.

Next, a third operation mode, that is, high-speed replay, is described. In the third operation mode, the data managing section 1001 reads the address table AT from the second storage area 10022. The data managing section 1001 reads only I-picture transport packets from the address areas described in the read address table AT, and then outputs a transport stream TS' composed of the read transport packets to the selector 1003.

For audio, in a case of double-speed replay, for example, the data managing section 1001 repeats a process of reading a transport packet of audio for one second, and then reading not a transport packet for the next one second but a transport packet representing audio after one second.

The selector 1003, the descrambler 1004, and the MPEG system decoder 1005 perform processing similar to that in the first operation mode to reproduce a video signal VS' and an audio signal AS'.

The video signal VS' is similar to the video signal VS in that both are baseband digital video signals, but is different therefrom in that reproduction is made only from I-picture transport packets. The audio signal AS' is similar to the audio signal AS in that both are baseband digital audio signals, but is different therefrom in that reproduction is made only from transport packets representing a part of audio. Therefore, when the display device, typified by a television, processes the video signal VS' and the audio signal AS', a program is played at a speed higher than that in normal replay.

As described above, the conventional recording/reproducing system has a decode processing system configured by the selector 1003, the descrambler 1004, the MPEG system decoder 1005, etc., and a read/write processing system configured by the data managing section 1001, the storage medium 1002, etc., both systems being adjacently placed within a box.

In recent years, a plurality of display devices are often placed in a living space. Therefore, desires have risen for one read/write processing system to be placed at a specific location within a living space, while the decode processing system be placed closely to each of the plurality of display devices.

However, there has been a problem that high-speed replay is difficult to achieve by merely dividing the conventional recording/reproducing system into a read/write processing system and a decode processing system, and placing the read/write processing system and the decode processing system away from each other as being connected by a cable.

The reasons of the above are as follows. When the read/write processing system and the decode processing system are close to each other within the same box, the buffer provided in the data managing section 1001 can absorb a difference between a time when the transport stream TS arrives at the data managing section 1001 and a time when the position information PI arrives there. However, when the read/write processing system and the decode processing system are placed away from each other, it is not possible to accurately know approximately how long the position information PI will delay for arrival time of the transport stream TS. Such a deviation in arrival timing may prevent the managing section 1001 from generating the address table AT. Consequently, high-speed replay is difficult to achieve.

Also, in the conventional recording/producing system, the transport stream TS and the address table AT are written in different storage areas in the storage medium 1002. Therefore, there has been another problem that a writing process performed by the data managing section 1001 is complex.

Therefore, an object of the present invention is to provide a recording/reproducing system capable of easily performing high-speed replay.

Another object of the present invention is to provide a recording/reproducing system capable of performing high-speed replay even when the decode processing system and the read/write processing system are placed away from each other.

SUMMARY OF THE INVENTION

The present invention comprises aspects having the following technical effects, thereby achieving the above objects. A first aspect is directed to a system for performing a recording process and a reproducing process on a received transport stream, wherein the transport stream is composed of a plurality of transport packets, a payload of a part of the transport packets includes a part of a scrambled I picture, and further a predetermined reserved bit in a header of each transport packet is set to a first value.

Here, the above recording/reproducing system includes a decode unit for receiving the transport stream and a storage unit. The decode unit includes: a branching section for branching the received transport stream into two for output; a descrambler for descrambling one of transport streams output from the branching section, and outputting the transport stream with each scrambled payload descrambled; an I-picture detecting section for detecting the payload including a part of the I picture in the transport stream output from the descrambler, and outputting the detection results; a header processing section for specifying, based on the detection results output from the I-picture detecting section, a header added to a payload of an I picture in another one of the transport streams output from the branching section, changing a value of the reserved bit in the specified header to a second value, which is different from the first value, for output; and a first interface for transmitting the transport stream output from the header processing section to the storage unit.

Furthermore, the storage unit includes: a second interface for receiving the transport stream from the first interface for output; a data managing section for performing a writing process on the transport stream output from the second interface; and a storage medium for storing the transport packet subjected to the writing process performed by the data managing section.

According to a second aspect based on the first aspect, the reserved bit is transport_priority defined by ISO/IEC13818-1.

According to the first and second aspects, the reserved bit of the transport stream is used for I-picture determination. Therefore, without generation of an address table, which has been conventionally required, the data managing section can selectively read a transport packet including a part of I pictures in high-speed replay. As a result, the data managing section can easily manage the storage area of the storage medium.

Furthermore, since no address table is required, a conventionally-required accurate control of arrival timing between the transport stream and the position information is also not required. Still further, with the use of the reserved bit, only an I-picture transport packet can be easily selected. Therefore, the decode unit and the storage unit can be separately placed.

According to a third aspect based on the first aspect, the decode unit further includes a system decoder, and the storage unit further includes a packet selector. The data managing section further reads the transport packet stored in the storage medium for output. The packet selector selects, from transport packets output from the data managing section, packets each having a reserved bit set to the second value, and outputs a transport stream composed of the selected transport packets. The second interface further transmits the transport stream output from the packet selector to the decode unit. The first interface outputs the transport stream received from the second interface. The descrambler descrambles the transport stream output from the first interface, and outputs the transport stream with each payload descrambled. The system decoder decodes the transport stream output from the descrambler to reproduce a digital video signal and a digital audio signal.

According to the third aspect, based on the value of the reserved bit, the data managing section can select only an I-picture transport stream. Therefore, high-speed replay can be performed easily and accurately.

According to a fourth aspect based on the first aspect, the first interface and the second interface are communicably connected to each other via a cable or wirelessly.

According to the fourth aspect, the storage unit and the decode unit can be placed far away from each other.

A fifth aspect is directed to a method of processing a received transport stream, wherein the transport stream is composed a plurality of transport packets, a payload of a part of the transport packets includes a part of a scrambled I picture, and further a predetermined reserved bit in a header of each transport packet is set to a first value.

The above method includes: a branching step of branching the received transport stream into two for output; a descrambling step of descrambling one of transport streams output in the branching step, and outputting the transport stream with each scrambled payload descrambled; an I-picture detecting step of detecting, in the transport stream output in the descrambling step, the payload including the part of the I picture, and outputting the detection results; a header processing step of specifying, based on the detection results output in the I-picture detecting step, a header added to the payload of the I picture from another one of the transport streams output in the branching step, and changing a value of the reserved bit in the specified header to a second value, which is different from the first value, for output; and a writing step of writing the transport stream output in the header processing step in a recording medium.

A sixth aspect is directed to a storage unit for processing a received transport stream, wherein the transport stream is composed of a plurality of transport packets, a payload of a part of the transport packets includes a part of a scrambled I picture, and further a predetermined reserved bit in a header of each transport packet is set to a first value.

The above decode unit includes: a branching section for branching the received transport stream into two for output; a descrambler for descrambling one of transport streams output from the branching section, and outputting the transport stream with each scrambled payload descrambled for output; an I-picture detecting section for detecting the payload including the part of the I picture in the transport stream output from the descrambler, and outputting the detection results; a header processing section for specifying, based on the detection results output from the I-picture detecting section, a header added to the payload of the I picture from another one of the transport streams output in the branching step, and changing a value of the reserved bit in the specified header to a second value, which is different from the first value, for output; and a first interface for transmitting the transport stream output from the header processing section to an external storage unit.

A seventh aspect is directed to a storage unit for performing a writing process on a received transport stream, wherein the received transport stream is composed of several transport packets each having a header. Also, of the transport packets, a predetermined reserved bit in a header not including a part of I pictures is set to a first value, and the reserved bit in a header including a part of the I pictures is set to a second value, which is different from the first value.

The storage unit includes: a data managing section for performing the writing process on the received transport stream; and a storage medium for storing the transport packet subjected to the writing process performed by the data managing section. The data managing section further reads transport packets from the storage medium. The, storage unit further includes a packet selector for selecting, from the transport packets read by the data managing section, a TS packet whose reserved bit is set to a second value.

An eighth aspect is directed to a system for performing a recording process and a reproducing process on a received transport stream, wherein the transport stream is composed of a plurality of transport packets, and a payload of each transport packet includes a part of a packetized elementary stream. The packetized elementary stream is composed of a plurality of PES packets, a payload of a part of the PES packets includes a part of a scrambled I picture, and further a predetermined reserved bit in a header of each transport packet is set to a first value.

The recording/reproducing system includes: a decode unit and a storage unit. The decode unit includes: a branching section for branching the transport stream into two for output; a descrambler for descrambling one of transport streams output from the branching section, and outputting the transport stream with a scrambled payload of each PES packet descrambled; an I-picture detecting section for detecting, in the transport stream output from the descrambler, the payload of the PES packet including the I picture and outputting the detection results; a header processing section for specifying, based on the detection results output from the I-picture detecting section, a header added to the payload of the I picture in each PES packet from another one of the transport streams output from the branching section, and changing a value of the reserved bit in the specified header to a second value, which is different from the first value, for output; and a first interface for transmitting the transport stream output from the header processing section to the storage unit. The storage unit includes: a second interface for receiving the transport stream from the first interface for output; a PES composing section for composing a packetized elementary stream from the transport stream output from the second interface; a data managing section for performing a writing process on the packetized elementary stream output from the PES composing section; and a storage medium for storing the packetized elementary stream subjected to the writing process performed by the data managing section.

According to the eighth aspect, the value of the reserved bit of the packetized elementary stream is used for I-picture determination. With this, technical effects similar to those of the first aspect can be achieved.

According to a ninth aspect based on the eighth aspect, the first interface and the second interface are communicably connected to each other via a cable or wirelessly.

According to a tenth aspect based on the eighth aspect, the decode unit further includes a system decoder, and the storage unit further includes a packet selector and a TS composing section. The data managing section further reads packetized elementary streams stored in the storage medium for output. The packet selector selects, from the packetized elementary streams output from the data managing section, only a PES packet whose reserved bit has been set to the second value, and outputs a packetized elementary stream composed of the selected PES packet. The TS composing section composes a transport stream from the packetized elementary stream output from the packet selector. The second interface further transmits the transport stream output from the TS composing section to the decode unit. The first interface outputs the transport stream received from the second interface. The descrambler descrambles the transport stream output from the first interface, and outputs the transport stream with the scrambled payload of each PES packet descrambled. The system decoder decodes the transport stream output from the descrambler to reproduce a digital video signal and a digital audio signal.

According to the tenth aspect, based on the value of the reserved bit, the data managing section can select only an I-picture PES packet. Therefore, high-speed replay can be performed easily and accurately.

An eleventh aspect is directed to a method of processing a received transport stream, wherein the transport stream is composed of a plurality of transport packets, and a payload of each transport packet includes a part of a packetized elementary stream. The packetized elementary stream is composed of a plurality of PES packets, a payload of a part of the PES packets includes a scrambled I picture, and further a predetermined reserved bit in a header of each transport packet is set to a first value.

The transport processing method includes: a branching section step of branching the transport stream into two; a descrambling step of descrambling one of transport streams output in the branching step, and outputting the transport stream with the scrambled payload of each PES packet descrambled; an I-picture detecting step of detecting, in the transport stream output in the descrambling step, the payload of the PES packet including the I picture, and outputting the detection results; a header processing step of specifying, based on the detection results output in the I-picture detecting step, a header added to the payload of the I picture in each PES packet from another one of the transport streams output from the branching section, and changing a value of the reserved bit in the specified header to a second value, which is different from the first value, for output; and a writing step of writing the transport stream output in the header processing step in a storage medium.

A twelfth aspect is directed to a decode unit for processing a received transport stream, wherein the transport stream is composed of a plurality of transport packets, and a payload of each transport packet includes a part of a packetized elementary stream. The packetized elementary stream is composed of a plurality of PES packets, a payload of a part of the PES packets incudes a part of a scrambled I picture, and further a predetermined reserved bit in a header of each transport packet is set to a first value.

The above decode unit includes: a branching section for branching the transport stream into two; a descrambler for descrambling one of transport streams output from the branching section, and outputting the transport stream with the scrambled payload of each PES packet descrambled; an I-picture detecting section for detecting, in the transport stream output from the descrambler, the payload of the PES packet including the I picture, and outputting the detection results; a header processing section for specifying, based on the detection results output from the I-picture detecting section, a header added to the payload of the I picture in each PES packet from another one of the transport streams output from the branching section, and changing a value of the reserved bit in the specified header to a second value, which is different from the first value, for output; and a first interface for transmitting the transport stream from the header processing section to an external storage unit.

A thirteenth aspect is directed to a storage for performing a writing process on a received transport stream, wherein the transport stream is composed of a plurality of transport packets, and a payload of each transport packet includes a part of a packetized elementary stream, and the packetized elementary stream is composed of a plurality of PES packets. Of the plurality of PES packets, a predetermined reserved bit in a header not including a part of I pictures is set to a first value, and further the reserved bit in a header of a PES packet including a part of the I pictures is set to a second value, which is different from the first value.

The above storage unit includes: a PES composing section for composing the packetized elementary stream from the received transport stream; a data managing section for performing the writing process on the packetized elementary stream output from the PES composing section; and a storage medium for storing the packetized elementary stream subjected to the writing process performed by the data managing section. The data managing section further reads the packetized elementary stream from the storage medium, and the storage unit further includes a packet selector for selecting, from the packetized elementary stream read by the data managing section, a PES packet whose reserved bit is set to a second value.

A TS multiplex step involves performing a multiplex process on the stream, and generating the transport stream.

BRIEF DESCRIPTION OF THE DRAWINGS

FIG. 2 is an illustration showing a data structure of a transport packet arriving at a decode unit $DU_1$ of FIG. 1.

FIG. 4 is an illustration showing a data structure of a PES packet to be processed by a decode unit $DU_2$ of FIG. 3.

FIG. 5 is a block diagram illustrating the entire configuration of a transmission system according to a third embodiment of the present invention.

FIG. 6 is a block diagram illustrating a recording/reproducing system $RRS_3$ accommodated in the transmission system of FIG. 5.

DETAILED DESCRIPTION OF THE INVENTION

Figure 1:
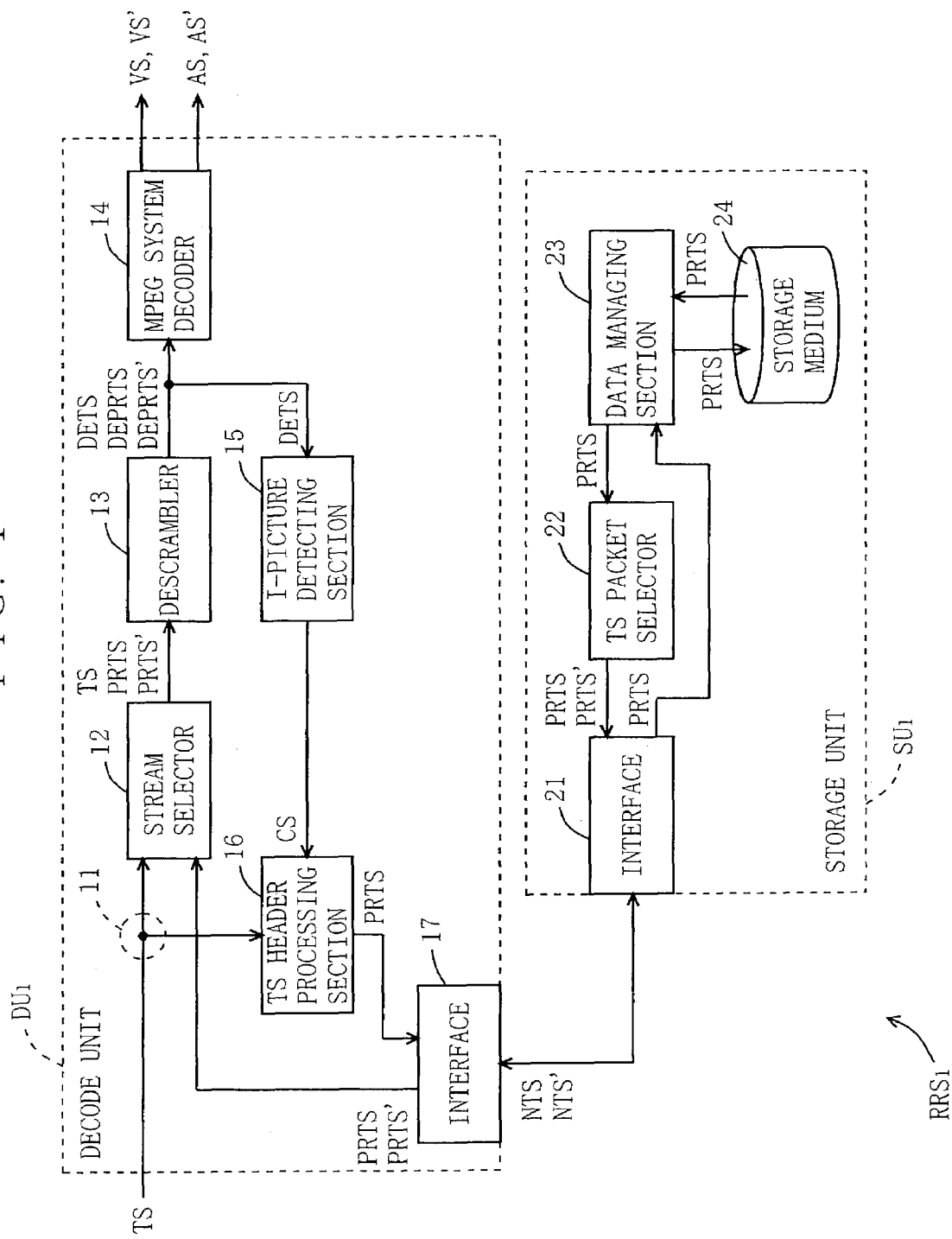
FIG. 1 is a block diagram illustrating the entire configuration of a recording/reproducing system $RRS_1$ according to a first embodiment of the present invention.

FIG. 1 is a block diagram illustrating the configuration of a recording/reproducing system $RRS_1$ according to a first embodiment. The recording/reproducing system $RRS_1$ includes a decode unit $DU_1$ and a storage unit $SU_1$.

The decode unit $DU_1$ constructs a decode processing system, including a branching section 11, a stream selector 12, a descrambler 13, an MPEG system decoder 14, an I-picture detecting section 15, a TS header processing section 16, and an interface 17.

The storage unit $SU_1$ constructs a read/write processing system, including an interface 21, a TS packet selector 22, a data managing section 23, and a storage medium 24.

The above decode unit $DU_1$ and the storage unit $SU_1$ are accommodated in a network. More specifically, the decode unit $DU_1$ and the storage unit $SU_1$ are connected by a cable (not shown) complying with an interface standard typified by IEEE 1394. With this, the decode unit $DU_1$ can be placed away from the storage unit $SU_1$ with a distance defined by the interface standard as an upper limit.

Note that the decode unit $DU_1$ or the storage unit $SU_1$ may be connected with a device, typified by another decode unit (not shown), by another cable. Also, the decode unit $DU_1$ and the storage unit $SU_1$ are wirelessly connected to each other so as to communicate with each other.

Next, a recording process by the above-configured recording/reproducing system $RRS_1$ is described. A transmitting station (not shown) located far away from the recording/ reproducing system $RRS_1$ transmits a transport stream TS to the recording/reproducing system $RRS_1$. A typical example of the transmitting station is a broadcast satellite, a communications satellite, a terrestrial broadcast station, or a cable television's center station.

The transport stream TS is generated, in accordance with a high-efficiency encoding scheme typified by MPEG2, at least based on a digital video signal and a digital audio signal that compose a program. Furthermore, the transport stream TS is composed of several transport packets.

FIG. 2 illustrates definitions of bit strings composing a transport packet, which are excerpts from ISO/IEC 13818-1:1994(E), page 21, Table 2-2. Although the transport packet is illustrated as if it were a program function, each row corresponds to a bit string.

In FIG. 2, the transport packet is composed of a TS header and a payload. In the TS header, transport_priority is set as an item of information. Transport_priority is one example of a reserved bit, and is reserved for functional expansion in the future, for example. The transmitting station sets transport_priority of all TS headers to 0 (corresponding to a "first value").

Also, the payload includes a part of I pictures, B pictures, or P pictures, or an encoded digital audio signal for composing audio, and is scrambled by the transmitting station.

The above transport stream TS which has arrived at the recording/reproducing system $RRS_1$ is branched by the branching section 11 into two. One transport stream TS is output to the TS header processing section 16, while the other is output to the stream selector 12.

The TS header processing section 16 temporarily stores the input transport stream TS in its internal buffer, and waits for a control signal CS to come from the I-picture detecting section 15.

The stream selector 12 has an input system from the branching section 11 and an input system from the interface 17. For a recording process, the stream selector 12 selects the input system on the branching section 11 side for outputting the input transport stream TS as it is to the descrambler 13.

The descrambler 13 performs a descrambling process on the input transport stream TS with a descramble key. This process descrambles each scrambled payload to reconstruct the transport stream DETS as data strings that can be parsed. The transport stream DETS is output to the I-picture detecting section 15.

The I-picture detecting section 15 responds to the input of the transport stream DETS to start a process of generating a control signal CS. First, the I-picture detecting section 15 parses each transport packet to determine whether a payload of the transport packet being parsed includes a part of I pictures.

If a part of I pictures has been detected, the I-picture detecting section 15 generates a control signal CS indicative of the detection results for specifying a bit location in the transport stream DETS of the transport packet being parsed. The I-picture detecting section 15 outputs the generated control signal CS to the TS header processing section 16.

The TS header processing section 16 responds to the input of the control signal CS to start processing the header. As described above, the buffer of the TS header processing section 16 stores the scrambled transport stream TS.

The TS header processing section 16 specifies, based on the input control signal CS, the bit location of the transport packet whose payload includes a part of the I picture (hereinafter referred to as I-picture transport packet). Then, the TS header processing section 16 searches the buffer based on the specified bit location, selects the I-picture transport packet as a subject to be processed, and then changes the value of the transport_priority of the TS header to be processed from 0 to 1 (corresponding to a second value").

The TS header processing section 16 performs a header process on all I-picture transport packets to generate a header-processed transport stream PRTS. The transport stream PRTS is output to the interface 17.

The interface 17 performs a process defined by the interface standard on the input transport stream PRTS to generate a transport stream NTS having a format suitable to the network for transmission to the interface 21 of the storage unit $SU_1$.

The interface 21 performs a process defined by the interface standard to convert the received transport stream NTS to a transport stream PRTS for output to the data managing section 23.

The data managing section 23 sequentially writes the transport packets composing the transport stream PRTS in the storage medium 24. With this, the header-processed transport stream PRTS is stored in the storage medium 24 as being scrambled.

When a user views a program in parallel with the above recording process, the descrambler 13 outputs the transport stream DETS to the MPEG system decoder 14. The MPEG system decoder 14 performs a decoding process defined by the MPEG2 on the input transport stream DETS to reproduce the video signal VS and the audio signal AS, which are baseband digital signals.

Next, normal replay in the recording/reproducing system $RRS_1$ is described. The data managing section 23 reads the transport stream PRTS sequentially from its head from the storage medium 24 for output to the TS packet selector 22.

In normal replay, the TS packet selector 22 outputs the input transport stream PRTS as it is to the interface 21.

The interface 21 generates a transport stream NTS from the input transport stream PRTS for transmission to the interface 17 of the decode unit $DU_1$.

The interface 17 converts the received transport stream NTS to the transport stream PRTS for output to the stream selector 12.

In normal replay, the stream selector 12 selects the input system of the interface 17 side to output the input transport stream PRTS as it is to the descrambler 13.

The descrambler 13 descrambles the input transport stream PRTS with the descramble key to reconstruct a transport stream DEPRTS, and further outputs the reconstructed transport stream DEPRTS to the MPEG system decoder 14.

The MPEG system decoder 14 reproduces the digital video signal VS and the digital audio signal AS from the input transport stream DEPRTS as described above.

Next, high-speed replay in the above-configured recording/reproducing system $RRS_1$ is described. The data managing section 23 reads the transport stream PRTS sequentially from the head from the storage medium 24 for output to the TS packet selector 22.

In high-speed replay, the TS packet selector 22 performs a determination process on each transport packet in the input transport stream PRTS.

The determination process is more specifically described. The TS packet selector 22 determines whether transport_priority in each transport packet composing the input transport stream PRTS indicates 0 or 1.

When transport_priority indicates 0, the payload of the transport packet subjected to the determination process includes a part of B pictures or P pictures, and the transport packet is not required for high-speed replay. Therefore, the TS packet selector 22 discards B-picture and P-picture transport packets.

Conversely, when transport_priority indicates 1, the payload of the transport packet subjected to the determination process includes a part of I picture, and the transport packet is required for high-speed replay. The TS packet selector 22 does not discard the transport packet whose transport_priority indicates 1, but outputs the same to the interface 21.

Based on the above determination process, the TS packet selector 22 selects only I-picture transport packets from the input transport stream PRTS. As a result, what is output from the TS packet selector 22 to the interface 21 is a transport stream PRTS composed of the I-picture transport packets.

The interface 21 generates a transport stream NTS' having a format suitable for the network from the input transport stream PRTS' for transmission to the interface 17 of the decode unit $DU_1$.

The interface 17 converts the received transport stream NTS' to a transport stream PRTS' for output to the stream selector 12.

In high-speed replay, the stream selector 12 selects the input system of the interface 17 side to output the input transport stream PRTS' as it is to the descrambler 13.

The descrambler 13 descrambles the payload composing a part of the input transport stream PRTS' to reconstruct a transport stream DEPRTS' including only descrambled I pictures for output to the MPEG system decoder 14.

The MPEG system decoder 14 reproduces a digital video signal VS' from the input transport stream DEPRTS'. The video signal VS' is similar to the video signal VS in that they are both baseband digital video signal, but is different therefrom in that reproduction is made only from I-picture transport packets. Consequently, the user can view a program being replayed at high speed on the display device. For audio, a scheme to be taken is similar to a conventional scheme for high-speed replay, and therefore is not described herein.

Note that the above normal replay and high-speed replay are started by an instruction from the user as a trigger. The decode unit $DU_1$ responds to the user's instruction to communicate with the storage unit $SU_1$ to receive a list of programs currently stored in the storage medium 24. The communications at this time may use the network or another communications path.

Based on the received list, the storage unit $SU_1$ specifies a program which the user desires to see, and then indicates, to the data managing section 23 of the storage unit $SU_1$, a transport stream PRTS to be read. In response to this indication, the data managing section 23 starts the reading process as described at the outset of the descriptions of normal replay and high-speed replay.

As described above, according to the recording/reproducing system $RRS_1$, a reserved bit of the transport stream TS is used for I-picture determination, thereby eliminating the need to generate the address table AT. With this, even when the storage unit $SU_1$ as the read/write processing system and the decode unit $DU_1$ as the decode processing system are placed at different locations, transport packets including only I pictures required for high-speed replay can be selected.

Furthermore, an additional technical effect of the recording/reproducing system $RRS_1$ is that, in high-speed replay, the transport stream PRTS including only I pictures is passed through the network. In other words, transport packets including unnecessary P pictures or B pictures are not passed. With this, traffic on the network can be minimized.

Figure 3:
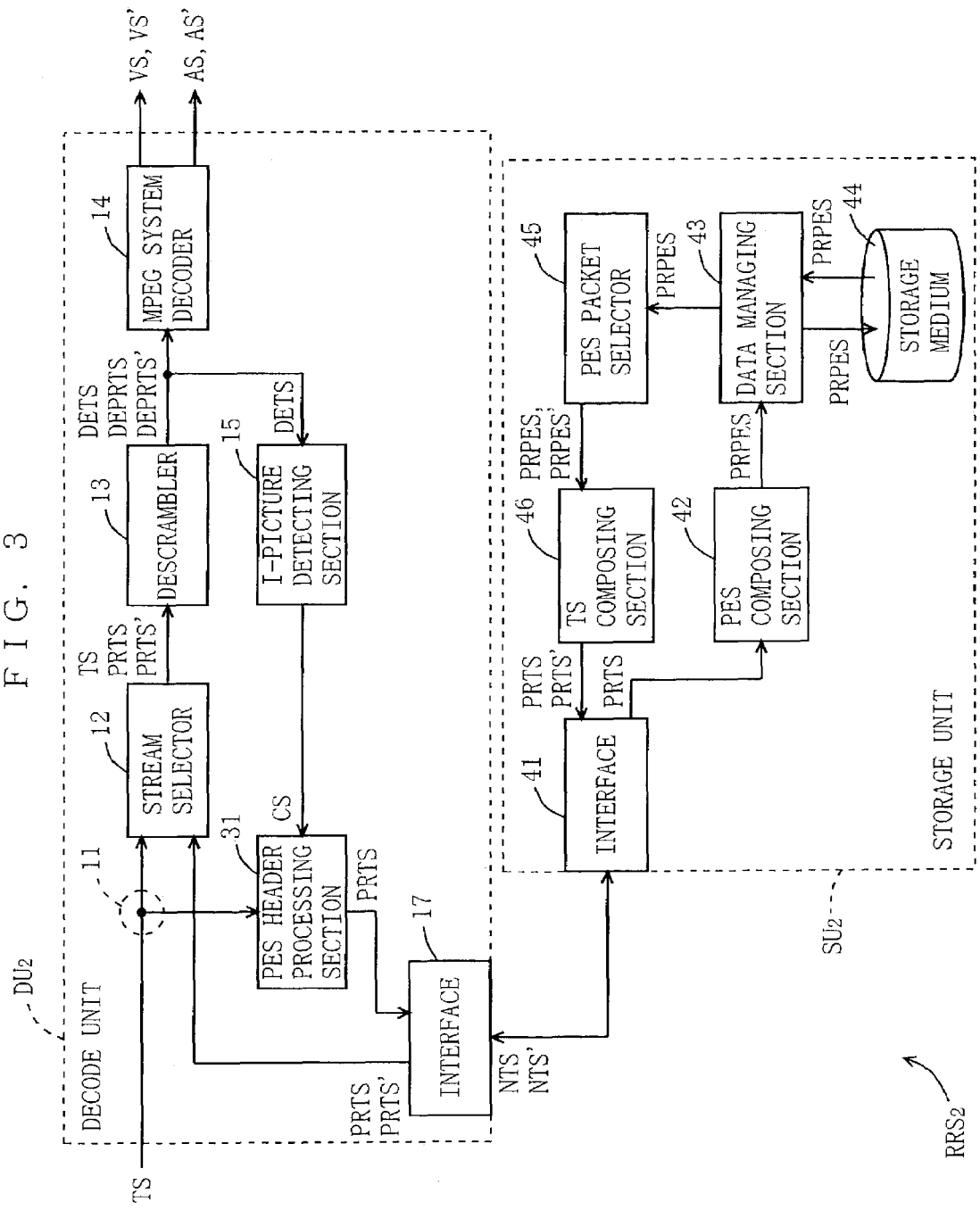
FIG. 3 is a block diagram illustrating the entire configuration of a recording/reproducing system $RRS_2$ according to a second embodiment of the present invention.

FIG. 3 is a block diagram illustrating a recording/reproducing system according to a second embodiment. In a recording/reproducing system $RRS_2$, a decode unit $DU_2$ and a storage unit $SU_2$ are accommodated in a network.

The decode unit $DU_2$ is different from the decode unit $DU_1$ (refer to FIG. 1) in that the TS header processing section 16 is replaced by a PES header processing section 31. There are no further differences other than the above. Therefore, in the decode unit $DU_2$, components corresponding to those of the decode unit $DU_1$ are provided with the same reference numerals, and are not described herein.

The storage unit $SU_2$ includes an interface 41, a PES composing section 42, a data managing section 43, a storage medium 44, a PES packet selector 45, and a TS composing section 46.

The decode unit $DU_2$ and the storage unit $SU_2$ are communicably connected to each other, as with the first embodiment.

Next, a recording process of the above-configured recording/reproducing system $RRS_2$ is described.

The transport stream TS (refer to FIG. 2) has been described in the first embodiment and, in more detail, is developed from an elementary stream generated based on a digital video signal and a digital audio signal and then a packetized elementary stream. The packetized elementary stream is composed of several PES packets.

FIG. 4 illustrates definitions of bit strings composing a PES packet, which are excerpts from ISO/IEC 13818-1: 1994(E), p. 33, Table 2-17. Although the PES packet is illustrated as if it were a program function, each row corresponds to a bit string.

In FIG. 4, the transport packet is composed of a PES header and a payload. In the TS header, PES_priority is set as an item of information. PES_priority is one example of a reserved bit. The transmitting station sets PES_priority of all TS headers to 0 (corresponding to a "first value").

Also, the payload includes a part of an I picture, B picture, or P picture, or an encoded digital audio signal for composing audio, and is scrambled by the transmitting station. As described above, in the second embodiment, the payload of the packetized elementary stream is scrambled.

The above packetized elementary stream is divided to a size defined by MPEG2, and is then included in the payload of the transport stream TS. After arriving at the decode unit $DU_2$, the above transport stream TS is then supplied through the branching section 11 to the PES header processing section 31 and the stream selector 12.

The PES header processing section 31 temporarily stores the input transport stream TS in its internal buffer, and then waits for a control signal CS to come from the I-picture detecting section 15.

The descrambler 13 and the I-picture detecting section 15 operate as described in the first embodiment. Consequently, the I-picture detecting section 15 outputs a control signal CS to the PES header processing section 31.

The PES header processing section 31 responds to the input of the control signal CS to start a header process. As described above, the TS header processing section 16 holds, in its internal buffer, the transport stream TS having the payload of the PES packet scrambled.

The PES header processing section 31 refers to the input control signal CS and specifies, on the currently-held transport stream TS, a bit location of each PES packet whose payload portion includes an I picture (hereinafter referred to as I-picture PES packet). The PES header processing section 31 then changes the value of PES_priority (refer to FIG. 4) set at the PES header included in the specified I-picture PES packet from 0 to 1.

The PES header processing section 31 performs a header process on all of the I-picture PES packets to generate a transport stream PRTS for output to the interface 17.

The interface 17 generates, as with the first embodiment, a transport stream NTS for transmission to the interface 21 of the storage unit $SU_2$.

The interface 21 performs an operation in reverse to that of the interface 17 to reproduce the transport stream PRTS for output to the PES composing section 42.

The PES composing section 42 decomposes the input transport stream PRTS to reproduce a header-processed packetized elementary stream PRPES. The packetized elementary stream PRPES is output to the data managing section 43.

The data managing section 43 sequentially writes each PES packet composing the input packetized elementary stream PRPES in the storage medium 44. With this, what is stored in the storage medium 44 is the header-processed packetized elementary stream PRPES with each payload scrambled.

When a user views a program in parallel with the above recording process, the descrambler 13 outputs the transport stream DETS to the MPEG system decoder 14. The MPEG system decoder 14 performs a decoding process defined by MPEG2 on the input transport stream DETS to reproduce the video signal VS and the audio signal AS, which are baseband digital signals.

Next, normal replay in the above-configured recording/reproducing system $RRS_2$ is described. The data managing section 43 reads the packetized elementary stream PRPES from its head for output to the PES packet selector 45.

In normal replay, the PES packet selector 45 outputs the input packetized elementary stream PRPES as it is to the TS composing section 46.

The TS composing section 46 generates a transport stream PRTS from the input packetized elementary stream PRPES for output to the interface 21.

The interface 21 generates a transport stream NTS from the input transport stream PRTS for transmission to the interface 17 of the decode unit $DU_2$.

The decode unit $DU_2$ operates in a manner similar to that of the decode unit $DU_1$ in normal replay. As a result, what is output from the MPEG system decoder 14 is the digital video signal VS and the digital audio signal AS.

Next, the operation in high-speed replay in the above-configured recording/reproducing system $RRS_2$ is described. The data managing section 43 reads the packetized elementary stream PRPES sequentially from its head from the storage medium 44 for output to the PES packet selector 45.

In high-speed replay, the PES packet selector 45 performs a determination process on each PES packet in the input packetized elementary stream PRPES.

The determination process is more specifically described. The PES packet selector 45 determines whether PES_priority of each PES packet indicates 0 or 1.

When PES_priority indicates 0, the payload of the PES packet subjected to the determination process includes a B picture or P picture, and the PES packet subjected to the determination process is not required for high-speed replay. Therefore, the PES packet whose PES_priority indicates 0 is discarded.

Conversely, when PES_priority indicates 1, the payload of the transport packet subjected to the determination process includes an I picture, and the transport packet subjected to the determination process is required for high-speed replay. Therefore, the TS packet selector 22 does not discard the transport packet whose PES_priority indicates 1, but outputs the same to the interface 21. As such, the PES packet selector 45 selects only I-picture PES packets from the input packetized elementary stream PRPES. Consequently, what is output from the PES packet selector 45 to the TS composing section 46 is a packetized elementary stream PRPES composed of the I-picture PES packets.

The TS composing section 46 generates a transport stream PRTS' from the input packetized elementary stream PRPES'. The transport stream PRTS' is composed of TS packets each having a part of I pictures included in its payload, and is output from the TS composing section 46 to the interface 41.

The interface 41 generates a transport stream NTS' from the input transport stream PRTS' for transmission to the interface 17 of the decode unit $DU_2$.

The decode unit $DU_2$ operates in a manner similar to that of the decode unit $DU_1$ in high-speed replay. Consequently, from the MPEG system decoder 14, a digital video signal VS' and a digital audio signal AS' are reproduced. The video signal VS' is similar to the video signal VS in that both are baseband digital video signals, but is different therefrom in that reproduction is made only from I-picture transport packets. As a result, the user can view a program being played at high speed on the display device. For audio, the scheme to be applied is similar to a conventional scheme for high-speed replay, and therefore is not described herein.

As described above, according to the recording/reproducing system $RRS_2$, a reserved bit of the packetized elementary stream PES is used for I-picture determination, thereby eliminating the need to generate the address table AT, which is conventionally required. With this, a reading process and a writing process in the data managing section 43 can be simplified.

Furthermore, an additional technical effect of the recording/reproducing system $RRS_2$ is, as with the first embodiment, that traffic on the network can be minimized in high-speed replay.

In the above embodiment, a cable connecting between the interfaces 17 and 41 conforms to IEEE 1394. Therefore, it is the TS composing section 46 that converts the packetized elementary stream PRPES or PRPES' to the transport stream PRTS or PRTS'. However, the TS composing section 46 may be omitted if the interfaces 17 and 41 can exchange the packetized elementary stream PRPES or PRPES' without any restrictions of the standard.

Next, a third embodiment of the present invention is described. In the first embodiment, the decode unit $DU_1$, that is, a receiving side of the transport stream TS, processes the header of the TS packet in order to solve the problem set in the present invention. However, a process of processing the TS header can also be performed at the transmitting station.

FIG. 5 is a block diagram illustrating the entire configuration of a transmission system according to the third embodiment. In FIG. 5, the transmission system includes a transmitting station 51 and a recording/reproducing system $RRS_3$. The transmitting station 51 transmits a transport stream TS via a transmission path TP to the recording/reproducing system $RRS_3$.

FIG. 5 further illustrates a detailed block structure of the transmitting station 51. In FIG. 5, the transmitting station 51 is typically a broadcast station of a broadcast satellite, a communications satellite, or terrestrial broadcast station, or a center station of a cable television, and includes a video encoder 61, an I-picture detecting section 62, a video TS composing section 63, a video scrambler 64, an audio encoder 65, an audio TS composing section 66, an audio scrambler 67, a TS multiplex section 68, and a transmission path encoding/modulating section 69.

Also, as illustrated in FIG. 6, in the recording/reproducing system $RRS_3$, a decode unit $DU_3$ and a storage unit $SU_3$ are communicably connected to each other via a network.

The recoding/reproducing system $RRS_3$ is different from the recording/reproducing system $RRS_1$ in that a demodulating/transmission path decoding section 71 is provided to a front end of the decode unit $DU_3$, that a partializing section 72 is provided instead of the TS header processing section 15, and that no I-picture detecting section 15 is provided. There are no further differences other than the above. Therefore, in the recording/reproducing system $RRS_3$, components corresponding to those of the recording/reproducing system $RRS_1$ are provided with the same reference numerals, and are not described herein.

Next, the operation at the time of a process of recording a transport stream TS in the above-configured transmission system is described.

First, in FIG. 5, the video encoder 61 of the transmitting station 51 is supplied with a baseband digital video signal VS. The video encoder 61 performs an encoding process conforming to the MPEG2 video standard on the input digital video signal VS to generate a video elementary stream VES. The elementary stream is branched into two, and then one stream is input to the I-picture detecting section 62 and the other is input to the video VS composing section 63.

The I-picture detecting section 62 responds to the input of the elementary stream VES to start a process of generating a control signal CS. First, the I-picture detecting section 62 detects an I picture in the input elementary stream VES.

If an I picture has been detected, the I-picture detecting section 62 generates a control signal $CS_1$ for output to the video TS composing section 63. The control signal $CS_1$ is a signal for instructing the video TS composing section 63 so as to set the value of transport_priority (refer to FIG. 2), which is one example of a reserved bit, to 1, which is one example of a predetermined first value.

Also, if a B picture or a P picture has been detected, the I-picture detecting section 62 preferably generates a control signal $CS_2$ for output to the video TS composing section 63. The control signal $CS_2$ is a signal for instructing such that the value of transport_priority is 0, which is one example of a predetermined second value.

The video TS composing section 63 composes a plurality of video TS packets from the input elementary stream VES.

Note herein that the video TS composing section 63 generates each TS packet based on the control signal $CS_1$ or $CS_2$. More specifically, the video TS composing section 63 is supplied with the control signal $CS_1$ and the I picture with substantially the same timing. When a part of an I picture is to be included in the payload, the video TS composing section 63 composes TS packets by adding a TS header in which 1 is set as transport_priority in the payload.

Conversely, when the control signal $CS_2$ is supplied, the video TS composing section 63 generates, based on the B picture or the P picture, TS packets whose transport_priority of the header has been set to 0 and whose payload includes a part of a B picture or P picture.

The video TS composing section 63 sequentially arranges the TS packets to generate a transport stream VTS. The transport stream VTS is output to the video scrambler 64.

The video scrambler 64 scrambles each payload in the input transport stream VTS. The scrambled transport VTS is output as a transport stream SVTS to the multiplex section 68.

The audio encoder 65, the audio TS composing section 66, and the audio scrambler 67 can be constructed with known techniques, and therefore are not described in detail. From a baseband digital audio signal, a transport stream SATS is generated, and is output to the TS multiplex section 68.

The transport stream SATS is composed of TS packets, and a payload of each TS packet is scrambled, as with the transport stream SVTS. However, there is a difference in that each payload of the transport stream SATS includes a part of encoded digital audio signal.

The TS multiplex section 68 multiplexes the output transport stream SATS of the audio scrambler 67 and the output transport stream SATS of the video scrambler 64 to generate the transport stream TS. Furthermore, although not shown, the TS multiplex section 68 may multiplex a stream based on data such as a program list onto the transport stream TS. The above transport stream TS is output to the transmission path encoding/modulating section 69.

The transmission path encoding/modulating section 69 performs an error correcting process and a modulating process suited for the characteristics of the transmission path TP on the input transport stream TS, and then sends the same as a modulated signal MS to the transmission path TP.

The recording/reproducing system $RRS_3$ of FIG. 6 receives the modulated signal MS via the transmission path TP. More specifically, the modulated signal MS is received by the demodulating/transmission path decoding section 71 of the decode unit $DU_3$. The demodulating/transmission path decoding section 71 performs an operation in reverse to the operation of the transmission path encoding/modulating section 69, that is, a demodulating process and a decoding process to the received signal MS to reconstruct the transport stream TS. The reconstructed transport stream TS is output to the branching section 11.

The branching section 11 branches the input transport stream TS into two, and outputs one of the transport streams TS to the partializing section 72 and the other to the stream selector 12.

The partializing section 72 performs a partializing process to select TS packets each including a specific packet identifier (hereinafter referred to as PID (Packet Identifier)) from the transport stream TS. Here, the specific PID typically means one added to a TS packet including data of a program list, or one added to a TS packet composing a user-viewable program by contract. The partializing section 72 outputs, to the interface 17, a transport stream TS composed of the TS packets selected through the partializing process as a transport stream STS.

The interface 17 generates, from the input transport stream STS, a transport stream NTS in a format suited for the network. The transport stream NTS is transmitted on the network, and is then received by the interface 21 of the storage unit $SU_3$.

The storage unit $SU_3$ performs a process similar to that of the storage unit $SU_1$ to write the transport stream STS in the storage medium 24. In the transport stream STS, as with the transport stream PRTS in the first embodiment, transport_priority of the TS packet including a part of I pictures is set to 1. Furthermore, each payload has been scrambled.

When the user views a program in parallel to the above recording process, the stream selector 12, the descrambler 13, and the MPEG system decoder 14 operate in a manner similar to that described in the first embodiment. As a result, the video signal VS and the audio signal AS, which are baseband digital signals, are reproduced.

Also, the operation in normal replay in the recording/reproducing system $RRS_3$ is similar to that in the first embodiment, and is therefore not described herein.

Furthermore, the operation in high-speed replay in the recording/reproducing system $RRS_3$ is also similar to that in the first embodiment, and is therefore not described herein. As described above, according to the recording/reproducing system $RRS_3$, as with the first embodiment, a reserved bit of the transport stream TS is used for I picture determination. Therefore, also in the third embodiment, technical effects as described in the first embodiment can be obtained.

Next, a fourth embodiment of the present invention is described. In the second embodiment, the decode unit $DU_2$, that is, the side of receiving the transport stream TS, processes the header of the PES packet in order to solve the problem in the present application. However, the header can be processed also at the transmitting station.

Figure 7:
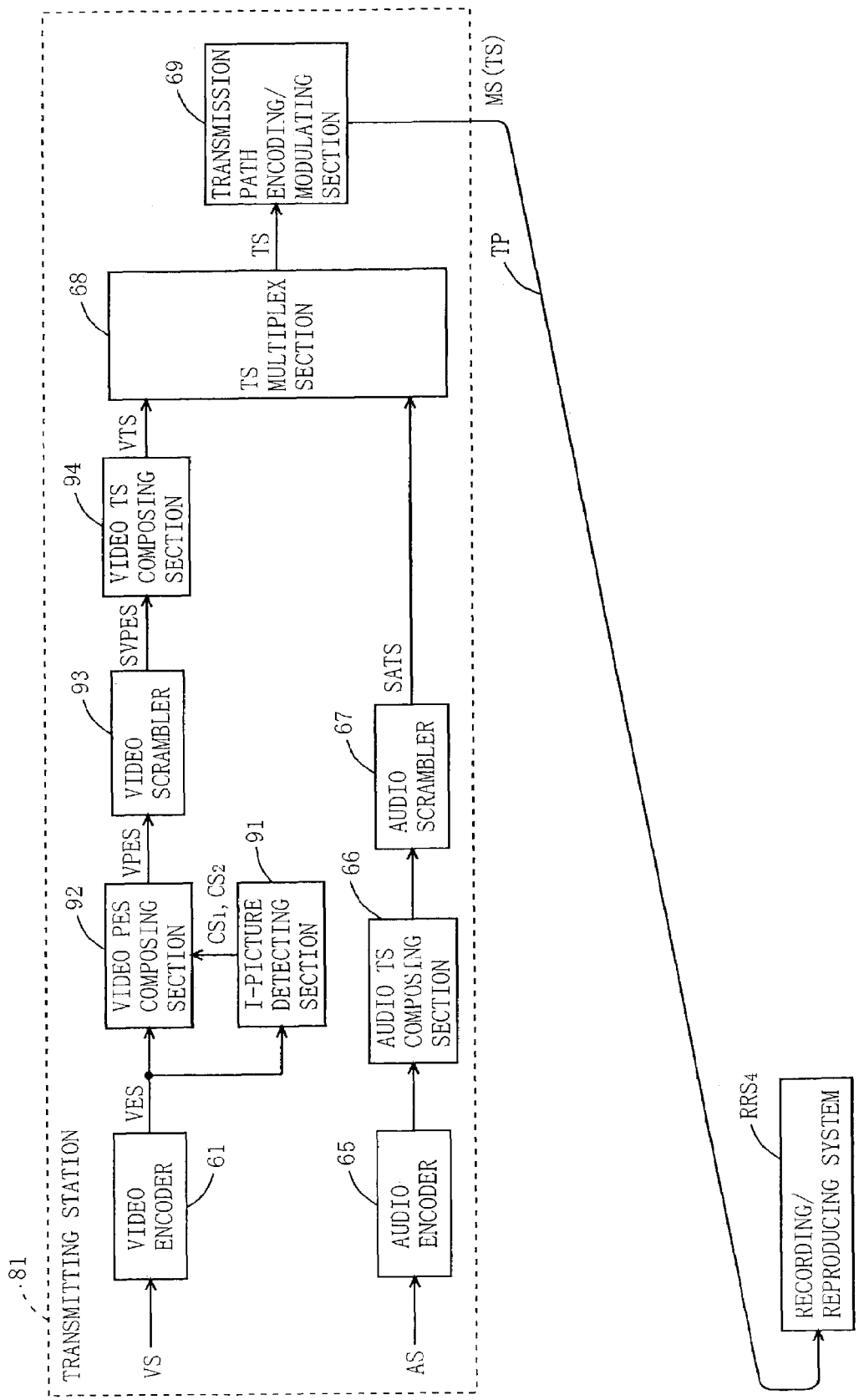
FIG. 7 is a block diagram illustrating the entire configuration of a transmission system according to a fourth embodiment of the present invention.

FIG. 7 is a block diagram illustrating the entire configuration of a transmission system according to the fourth embodiment. In FIG. 7, the transmission system includes a transmitting station 81 and a recording/reproducing system $RRS_4$. The transmitting station 81 transmits the transport stream TS via a transmission path TP to the recording/reproducing system $RRS_4$.

FIG. 7 further illustrates a detailed block structure of the transmitting station 81. The transmitting station 81 is different from the transmitting station 51 (refer to FIG. 5) in that portions of the I-picture detecting section 62, the video TS composing section 63, and the video scrambler 64 are replaced by an I-picture detecting section 91, a video PES composing section 92, a video scrambler 93, and a video TS composing section 94. There are no further differences other than the above. Therefore, in the transmitting station 81, components corresponding to those of the transmitting station 51 are provided with the same reference numerals, and are not described herein.

Figure 8:
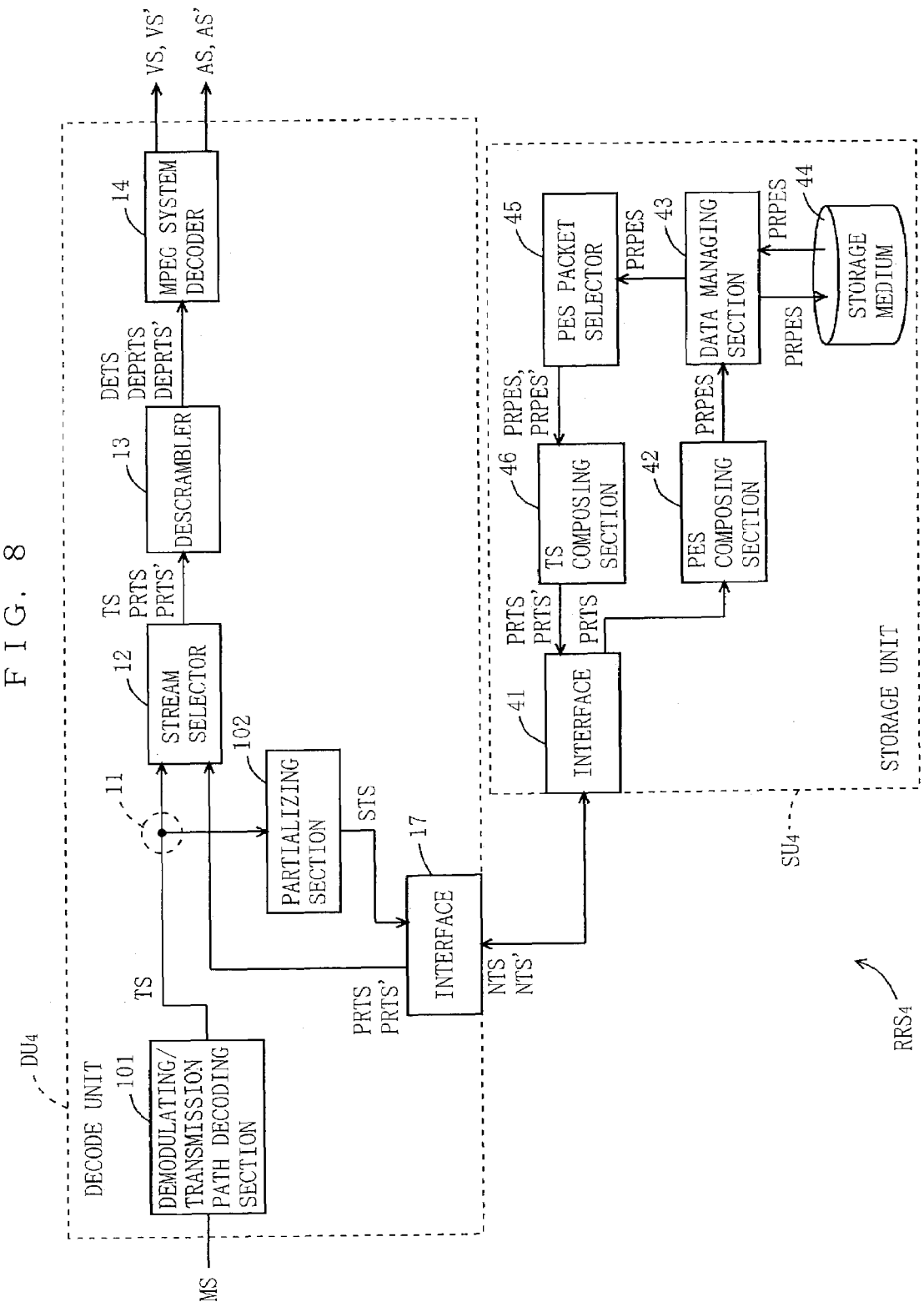
FIG. 8 is a block diagram illustrating the entire configuration of a recording/reproducing system $RRS_4$ accommodated in the transmission system of FIG. 7.
Figure 9:
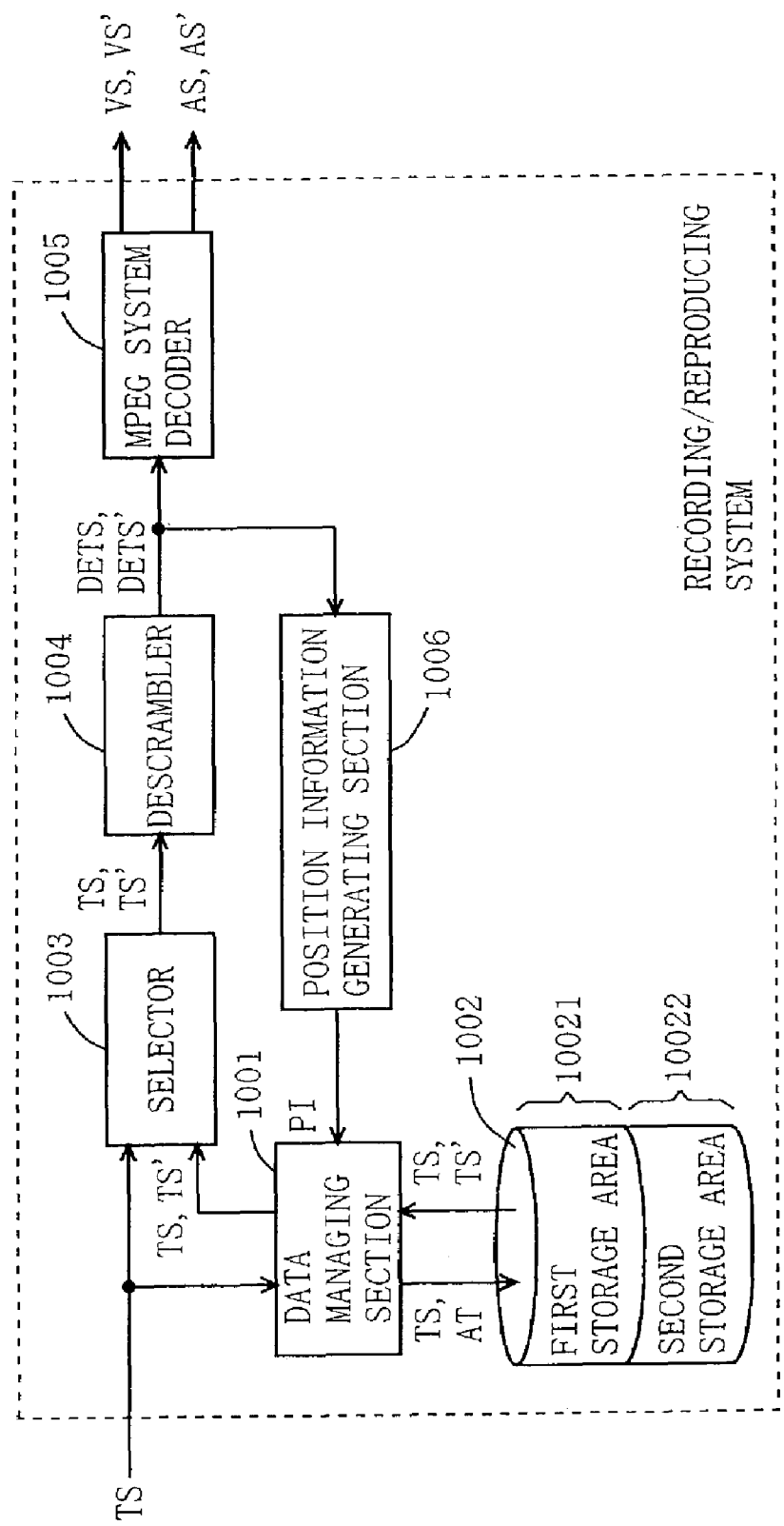
FIG. 9 is a block diagram illustrating the structure of a conventional recording/reproducing apparatus.

Also, the recording/reproducing system $RRS_4$ includes, as illustrated in FIG. 8, a decode unit $DU_4$ and a storage unit $SU_4$. The recording/reproducing system $RRS_4$ is different from the recording/reproducing system $RRS_2$ (refer to FIG. 3) in that a demodulating/transmission path decoding section 101 is provided at a front end of the decode unit $DU_4$, that a PES header processing section 15 is provided instead of the partializing section 102, and that no I-picture detecting section 15 is provided. There are no further differences other than the above. Therefore, in the recording/reproducing system $RRS_4$, components corresponding to those of the recording/reproducing system $RRS_2$ are provided with the same reference numerals, and are not described herein.

Next, in the above-configured transmission system, the operation at the time of a process of recording a transport stream TS is described.

In the transmission station 81 of FIG. 7, the audio encoder 65, the audio TS composing section 66, and the audio scrambler 67 outputs, as with the third embodiment, a transport stream SATS generated based on a digital audio signal AS to the TS multiplex section 68.

The video encoder 61 operates in a manner similar to that in the third embodiment to output the generated elementary stream VES to the I-picture detecting section 91 and the video PES composing section 92.

If an I picture has been detected in the input elementary stream VES, the I-picture detecting section 91 generates a control signal $CS_1$ for output to the video PES composing section 92. The control signal $CS_1$ is a signal for instructing the video PES composing section 92 to set the value of PES_priority (refer to FIG. 2), which is one example of a reserved bit, to 1.

Also, if a B picture or a P picture has been detected in the input elementary stream VES, the I-picture detecting section 91 generates a control signal $CS_2$ for output to the video PES composing section 92. The control signal $CS_2$ is a signal for instructing that the value of PES_priority is set to be 0, which is one example of the predetermined second value.

The video PES composing section 92 composes a plurality of video PES packets from the input elementary stream VES.

Note that, in such a composing process, the video PES composing section 92 generates a header of each PES packet based on the control signal $CS_1$ or $CS_2$. More specifically, the video PES composing section 92 is supplied with the control signal $CS_1$ and an I picture in substantially the same timing. When the I picture is included in the payload, the video PES composing section 92 adds a PES header whose PES_priority is set to 1 to the payload, to compose a PES packet.

Conversely, when the control signal $CS_2$ is supplied, the video PES composing section 92 generates, based on the B picture or the P picture, a PES packet whose PES_priority of the header is set to 0 and whose payload include a B picture or P picture.

The video PES composing section 92 sequentially arranges the generated PES packets to generate a video packetized elementary stream VPES. The packetized transport stream VPES is output to the video scrambler 93.

The video scrambler performs a scramble process for scrambling each payload in the input packetized elementary stream VPES. The scrambled packetized elementary stream VPES is output to the video TS composing section 94 as the packetized elementary stream SVPES.

The video TS composing section 94 composes a plurality of video TS packets from the input packetized elementary stream SVPES. Furthermore, the video TS composing section 94 sequentially arranges the generated TS packets to generate a transport stream VTS. The transport stream VTS is output to the TS multiplex section 68.

As a result, the demodulating/transmission path decoding section 101 of FIG. 8 receives, via the transmission path TP, a modulating signal MS modulated with the transport stream TS. The demodulation/transmission path decoding section 101 reconstructs, as with the demodulating/transmission path decoding section 71, the transport stream TS for output to the branching section 11.

The branching section 11 branches the input transport stream TS in two, and outputs one of the transport streams TS to the partializing section 102 and the other to the selector 12.

The partializing section 102 performs a partializing process similar to that of the partializing section 72 to reconstruct the transport stream TS for output to the interface 17.

The interface 17 generates a transport stream NTS from the transport stream STS for transmission to the interface 21 of the storage unit $SU_3$.

The storage unit $SU_3$ performs a process similar to that of the storage unit $SU_1$ to write the transport stream STS in the storage medium 24. In the transport stream STS, as with the packetized elementary stream PRPES of the second embodiment, PES_priority of the PES packet including an I picture is set to 1, and each payload has been scrambled.

Note that, when the user views a program in parallel with the above recording process, the stream selector 12, the descrambler 13, and the MPEG system decoder 14 operate in a manner similar to that in the first embodiment as described. Consequently, the video signal VS and the audio signal AS, which are baseband digital signals, are reproduced.

Also, the operation in normal replay in the recording/reproducing system $RRS_4$ is similar to that of the recording/reproducing system $RRS_2$, and is therefore not described herein.

Furthermore, the operation in high-speed replay in the recording/reproducing system $RRS_4$ is similar to that of the recording/reproducing system $RRS_2$, and is therefore not described herein. As described above, according to the recording/reproducing system $RRS_4$, as with the second embodiment, a reserved bit of the packetized elementary stream PES is used for I picture determination. Therefore, also in the fourth embodiment, technical effects similar to those of the second embodiment can be obtained.

Furthermore, in each of the above embodiments, a transport stream generated in accordance with MPEG2 arrives at the recording/reproducing systems $RRS_1$ to $RRS_4$. However, the recording/reproducing systems $RRS_1$ to $RRS_4$ can perform a similar process also on digital data generated in accordance with a DV scheme (consumer-oriented digital VCR standard).

INDUSTRIAL APPLICABILITY

The present invention is applied to a system for performing a recording process and a reproduction process on a transport stream transmitted from a transmitting station, and is applied, for example, to a set-top box, a television receiver and a recorder that are incorporated in a hard disk, or a set-top box, a television receiver, and a recorder that are connectable to a hard disk.

The invention claimed is:

1. A system for performing a recording process and a reproducing process on a received transport stream, wherein
the transport stream is composed of a plurality of transport packets, a payload of a part of the transport packets includes a part of a scrambled I picture, and further a predetermined reserved bit in a header of each transport packet is set to a first value, the system comprising:
a decode unit for receiving the transport stream; and
a storage unit, wherein
the decode unit includes:
a branching section for branching the received transport stream into two for output;
a descrambler for descrambling one of transport streams output from the branching section, and outputting the transport stream with each scrambled payload descrambled;
an I-picture detecting section for detecting the payload including a part of the I picture in the transport stream output from the descrambler, and outputting the detection results;
a header processing section for specifying, based on the detection results output from the I-picture detecting section, a header added to a payload of an I picture from another one of the transport streams output from the branching section, changing a value of the reserved bit in the specified header to a second value, which is different from the first value, for output; and
a first interface for transmitting the transport stream output from the header processing section to the storage unit, and
the storage unit includes:

a second interface for receiving the transport stream from the first interface for output;
a data managing section for performing a writing process on the transport stream output from the second interface; and
a storage medium for storing the transport packet subjected to the writing process performed by the data managing section.

2. The recording/reproducing system according to claim 1, wherein
the reserved bit is transport_priority defined by ISO/IEC13818-1.

3. The recording/reproducing system according to claim 1, wherein
the decode unit further includes a system decoder,
the storage unit further includes a packet selector,
the data managing section further reads the transport packet stored in the storage medium for output,
the packet selector selects, from transport packets output from the data managing section, packets each having a reserved bit set to the second value, and outputs a transport stream composed of the selected transport packets,
the second interface further transmits the transport stream output from the packet selector to the decode unit,
the first interface outputs the transport stream received from the second interface,
the descrambler descrambles the transport stream output from the first interface, and outputs the transport stream with each payload descrambled, and
the system decoder decodes the transport stream output from the descrambler to reproduce a digital video signal and a digital audio signal.

4. The recording/reproducing system according to claim 1, wherein
the first interface and the second interface are communicably connected to each other via a cable or wirelessly.

5. A method of processing a received transport stream, wherein
the transport stream is composed of a plurality of transport packets, a payload of a part of the transport packets includes a part of a scrambled I picture, and further a predetermined reserved bit in a header of each transport packet is set to a first value, the method comprising:
a branching step of branching the received transport stream into two for output;
a descrambling step of descrambling one of transport streams output in the branching step, and outputting the transport stream with each scrambled payload descrambled;
an I-picture detecting step of detecting, in the transport stream output in the descrambling step, the payload including the part of the I picture, and outputting the detection results;
a header processing step of specifying, based on the detection results output in the I-picture detecting step, a header added to the payload of the I picture from another one of the transport streams output in the branching step, and changing a value of the reserved bit in the specified header to a second value, which is different from the first value, for output; and
a writing step of writing the transport stream output in the header processing step in a recording medium.

6. A decode unit for processing a received transport stream, wherein
the transport stream is composed of a plurality of transport packets, a payload of a part of the transport packets includes a part of a scrambled I picture, and further a predetermined reserved bit in a header of each transport packet is set to a first value, the decode unit comprising:
a branching section for branching the received transport stream into two for output;
a descrambler for descrambling one of transport streams output from the branching section, and outputting the transport stream with each scrambled payload descrambled for output;
an I-picture detecting section for detecting the payload including the part of the I picture in the transport stream output from the descrambler, and outputting the detection results;
a header processing section for specifying, based on the detection results output from the I-picture detecting section, a header added to the payload of the I picture from another one of the transport streams output in the branching step, and changing a value of the reserved bit in the specified header to a second value, which is different from the first value, for output; and
a first interface for transmitting the transport stream output from the header processing section to an external storage unit.

7. A storage unit for performing a writing process on a received transport stream, wherein
the received transport stream is composed of several transport packets each having a header, and
of the transport packets, a predetermined reserved bit in a header not including a part of I pictures is set to a first value, and the reserved bit in a header including a part of the I pictures is set to a second value, which is different from the first value,
the storage unit comprising:
a data managing section for performing the writing process on the received transport stream; and
a storage medium for storing the transport packet subjected to the writing process performed by the data managing section, wherein
the data managing section further reads transport packets from the storage medium, and
the storage unit further comprising
a packet selector for selecting, from the transport packets read by the data managing section, a TS packet whose reserved bit is set to a second value.

8. A system for performing a recording process and a reproducing process on a received transport stream, wherein
the transport stream is composed of a plurality of transport packets, and a payload of each transport packet includes a part of a packetized elementary stream,
the packetized elementary stream is composed of a plurality of PES packets, a payload of a part of the PES packets includes a part of a scrambled I picture, and further a predetermined reserved bit in a header of each transport packet is set to a first value, the system comprising:
a decode unit; and
a storage unit, wherein
the decode unit includes:
a branching section for branching the transport stream into two for output;
a descrambler for descrambling one of transport streams output from the branching section, and outputting the transport stream with a scrambled payload of each PES packet descrambled;
an I-picture detecting section for detecting, in the transport stream output from the descrambler, the payload of the PES packet including the I picture, and outputting the detection results;
a header processing section for specifying, based on the detection results output from the I-picture detecting section, a header added to the payload of the I picture in each PES packet from another one of the transport streams output from the branching section, and changing a value of the reserved bit in the specified header to a second value, which is different from the first value, for output; and
a first interface for transmitting the transport stream output from the header processing section to the storage unit, and
the storage unit includes:
a second interface for receiving the transport stream from the first interface for output;
a PES composing section for composing a packetized elementary stream from the transport stream output from the second interface;
a data managing section for performing a writing process on the packetized elementary stream output from the PES composing section; and
a storage medium for storing the packetized elementary stream subjected to the writing process performed by the data managing section.

9. The recording/reproducing system according to claim 8, wherein
the first interface and the second interface are communicably connected to each other via a cable or wirelessly.

10. The recording/reproducing system according to claim 8, wherein
the decode unit further includes a system decoder,
the storage unit further includes a packet selector and a TS composing section,
the data managing section further reads packetized elementary streams stored in the storage medium for output,
the packet selector selects, from the packetized elementary streams output from the data managing section, only a PES packet whose reserved bit has been set to the second value, and outputs a packetized elementary stream composed of the selected PES packet,
the TS composing section composes a transport stream from the packetized elementary stream output from the packet selector,
the second interface further transmits the transport stream output from the TS composing section to the decode unit,
the first interface outputs the transport stream received from the second interface,
the descrambler descrambles the transport stream output from the first interface, and outputs the transport stream with the scrambled payload of each PES packet descrambled, and
the system decoder decodes the transport stream output from the descrambler to reproduce a digital video signal and a digital audio signal.

11. A method of processing a received transport stream, wherein
the transport stream is composed of a plurality of transport packets, and a payload of each transport packet includes a part of a packetized elementary stream,
the packetized elementary stream is composed of a plurality of PES packets, a payload of a part of the PES packets includes a scrambled I picture, and further a predetermined reserved bit in a header of each transport packet is set to a first value, the method comprising:

a branching section step of branching the transport stream into two;

a descrambling step of descrambling one of transport streams output in the branching step, and outputting the transport stream with the scrambled payload of each PES packet descrambled;

an I-picture detecting step of detecting, in the transport stream output in the descrambling step, the payload of the PES packet including the I picture, and outputting the detection results;

a header processing step of specifying, based on the detection results output in the I-picture detecting step, a header added to the payload of the I picture in each PES packet from another one of the transport streams output from the branching section, and changing a value of the reserved bit in the specified header to a second value, which is different from the first value, for output; and a writing step of writing the transport stream output in the header processing step in a storage medium.

12. A decode unit for processing a received transport stream, wherein the transport stream is composed of a plurality of transport packets, and payloads of the transport packets include a part of packetized elementary streams, the packetized elementary stream is composed of a plurality of PES packets, a payload of a part of the PES packets include a part of a scrambled I picture, and further a predetermined reserved bit in a header of each transport packet is set to a first value, the decode unit comprising:

a branching section for branching the transport stream into two;

a descrambler for descrambling one of transport streams output from the branching section, and outputting the transport stream with the scrambled payload of each PES packet descrambled;

an I-picture detecting section for detecting, in the transport stream output from the descrambler, the payload of the PES packet including the I picture, and outputting the detection results;

a header processing section for specifying, based on the detection results output from the I-picture detecting section, a header added to the payload of the I picture in each PES packet from another one of the transport streams output from the branching section, and changing a value of the reserved bit in the specified header to a second value, which is different from the first value, for output; and a first interface for transmitting the transport stream from the header processing section to an external storage unit.

13. A storage unit for performing a writing process on a received transport stream, wherein the transport stream is composed of a plurality of transport packets, and a payload of each transport packet includes a part of a packetized elementary stream, the packetized elementary stream is composed of a plurality of PES packets, of the plurality of PES packets, a predetermined reserved bit in a header not including a part of I pictures is set to a first value, and further the reserved bit in a header of a PES packet including a part of the I pictures is set to a second value, which is different from the first value, the storage unit comprising:

a PES composing section for composing the packetized elementary stream from the received transport stream;

a data managing section for performing the writing process on the packetized elementary stream output from the PES composing section; and a storage medium for storing the packetized elementary stream subjected to the writing process performed by the data managing section, wherein the data managing section further reads the packetized elementary streams from the storage medium, and the storage unit further comprising a packet selector for selecting, from the packetized elementary stream read by the data managing section, a PES packet whose reserved bit is set to a second value.

* * * * *